L. McCARTHY.
INSULATING JOINT.
APPLICATION FILED JAN. 13, 1912.

1,042,019.

Patented Oct. 22, 1912.

Witnesses:
John H. Parker
R. Wallace.

Inventor:
Louis McCarthy
by Macleod, Calvert, Copeland and Dike
Attorneys.

UNITED STATES PATENT OFFICE.

LOUIS McCARTHY, OF BOSTON, MASSACHUSETTS.

INSULATING-JOINT.

1,042,019. Specification of Letters Patent. Patented Oct. 22, 1912.

Application filed January 13, 1912. Serial No. 671,040.

*To all whom it may concern:*

Be it known that I, LOUIS MCCARTHY, a citizen of the United States, residing at Boston, county of Suffolk, State of Massachusetts, have invented a certain new and useful Improvement in Insulating-Joints, of which the following is a specification, reference being had therein to the accompanying drawings.

My invention has for its object an improvement in insulating joints such as are employed to connect rods or pipes mechanically and at the same time to insulate them electrically from each other. In an application filed by me January 5, 1912, Serial No. 669,583, I have shown and described an insulating joint of this type, which has a great increase in torsional strength over joints as previously constructed. This joint is composed essentially of a pair of polygonal members held together by a steel shell having the same polygonal form, the sides of the end members being parallel with the sides of the shell and there being interposed between the shell and the end members and between the proximate faces of the end members suitable insulating material which is under compression from the shell. Joints constructed in this manner have a very great increase in torsional strength and are therefore especially adapted to use where they are likely to receive such strains. This joint has a very high resistance to electricity, but breaks down finally by the current jumping across the insulation lying between the edge of the shell and the end members.

My present invention has for its object an improvement on the insulating joint described in this application, its particular object being to prevent the current jumping from the end member to the shell as above described, and at the same time to increase the mechanical strength of the joint. This is accomplished by providing a supplementary shell about the inner shell and by filling in this space between the edge of the supplementary shell and the end member with insulating material so that the space to be jumped is wider. This also has the effect of preventing moisture from settling in the crevices in the insulation adjacent and about the end member. In this manner the electrical resistance of the joint is materially increased.

The invention will be fully understood by reference to the following specification, taken in connection with the accompanying drawings, and the novel features thereof are pointed out and distinctly defined in the claims at the close of this specification.

Figure 1:
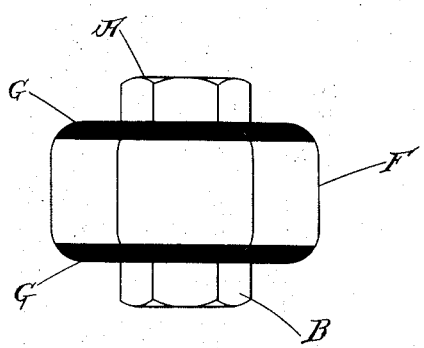
Figure 2:
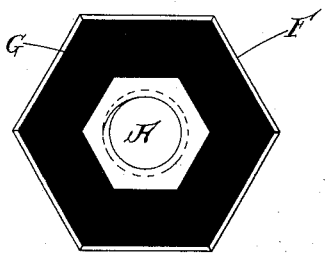
Figure 3:
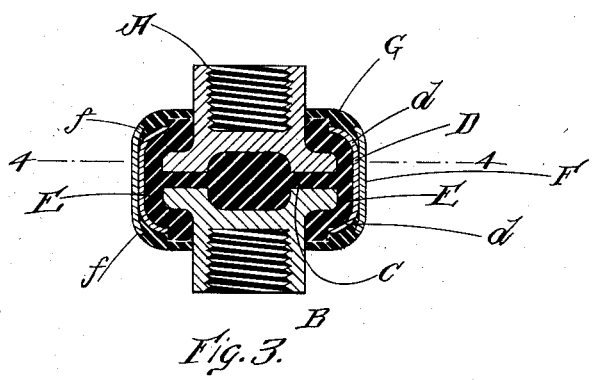
Figure 4:
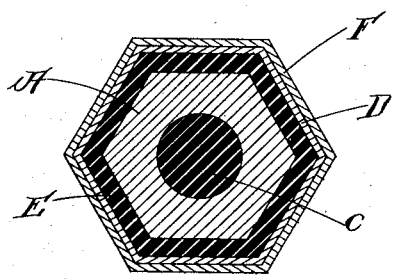

Referring to the drawings, Figure 1 is an elevation of a hexagonal joint embodying the invention. Fig. 2 is a top plan view of the joint shown in Fig. 1. Fig. 3 is a vertical section thereof. Fig. 4 is a section on line 4—4 Fig. 3.

At A and B are indicated two end members which are polygonal in form. In the drawings the polygon chosen for the insulator is a hexagon. Two end members A and B are separated from each other by an interposed layer of insulating material C and are surrounded and held together by a polygonal shell D, the ends of which are inturned as shown at *d*. Between the end members A and B and the shell D is located a layer of insulation E, which is of a material capable of being formed into a tube of polygonal cross section and after the parts have been assembled of being shaped by the pressure to which the shell D is subjected to turn in the ends *d* of the shell. The foregoing parts are all as described in my prior application and as therein stated may be made in the form of any desired polygon.

About the shell D, I place a second shell F which for convenience I call the supplementary shell. Said supplementary shell F is of the same polygonal form as the other members of the joint and is of a size to fit closely over the shell D. Its ends are then inturned slightly as shown at *f*, thereby securing the shell F in place. The edge of the supplementary shell is as far as possible from the exposed metal of the adjacent end member so as to increase the gap which the current must jump to the largest possible extent. The space between the edge of the supplementary shell F and the end member A or B, as the case may be, is filled in with a suitable plastic insulating material G which is capable of being molded such for instance as mica and shellac compound. Said insulation overlies and covers the edge of the first shell and the edge of the primary insulation and for convenience may be termed the supplementary insulation. This insulation is given a suitable exterior contour, as shown in Fig. 3, so that there shall be no projections.

The completed insulator constructed as described, will be seen to have a wrenchreceiving portion on its body which is made of a double thickness of metal and is therefore very strong and capable of withstanding a heavy turning strain without disturbing the relation of the parts. The gap produced by the supplementary insulation G is a wide one and this insulation prevents moisture lodging around the end members.

What I claim is:

1. The improved insulating joint comprising polygonal end members, a shell of the same polygonal form, insulating material separating the polygonal end members from each other and the said shell, a supplementary shell about the said first mentioned shell also of the same polygonal form, and a supplementary layer of insulation occupying the space between the edge of the supplementary shell and the end members, and overlying the edge of the first mentioned shell.

2. The combination with a flanged end member having a polygonal form, of a shell surrounding the flanged end portion of the said end member, said shell having the same polygonal form, a layer of insulation separating the said shell from the end member, a supplementary shell about the said first mentioned shell, said supplementary shell also having the same polygonal form, and a supplementary layer of insulation occupying the space between the edge of the supplementary shell and the end members, and overlying the edge of the first mentioned shell.

In testimony whereof I affix my signature, in presence of two witnesses.

LOUIS McCARTHY.

Witnesses:
J. ETHEL SCALLAN,
GARDNER W. PROUTY.